United States Patent [19]
Krause et al.

[11] Patent Number: 5,710,228
[45] Date of Patent: Jan. 20, 1998

[54] MALEIMIDE/α-OLEFIN COPOLYMERS AND THEIR USE AS LIGHT STABILIZERS AND STABILIZERS FOR ORGANIC MATERIAL

[75] Inventors: Alfred Krause, Schwetzingen; Walter Denzinger, Speyer; Albert Hettche, Hessheim; Alexander Aumueller, Neustadt; Hubert Trauth, Dudenhofen, all of Germany

[73] Assignee: BASF Aktiengesellschaft, Ludwigshafen, Germany

[21] Appl. No.: 644,123

[22] Filed: May 10, 1996

Related U.S. Application Data

[63] Continuation of Ser. No. 406,907, filed as PCT/EP93/03202 Nov. 15, 1993, published as WO94/12544 Jun. 9, 1994, abandoned.

[30] Foreign Application Priority Data

Nov. 24, 1992 [DE] Germany ............... 42 39 437.6

[51] Int. Cl.⁶ .................. C08F 222/40; C08F 210/00; C08F 2/06
[52] U.S. Cl. ................ 526/262; 526/348; 526/89
[58] Field of Search .................. 526/262, 348, 526/89

[56] References Cited

U.S. PATENT DOCUMENTS 4,520,171  5/1985  Diveley et al. .

FOREIGN PATENT DOCUMENTS

| 0303281 | 2/1989 | European Pat. Off. . |
| 3024525 | 2/1982 | Germany . |
| 262439 | 11/1988 | Germany . |
| 2145100 | 3/1985 | United Kingdom . |

*Primary Examiner*—Joseph L. Schofen
*Assistant Examiner*—W. C. Cheng
*Attorney, Agent, or Firm*—Oblon, Spivak, McClelland, Maier & Neustadt, P.C.

[57] ABSTRACT

Maleimide/α-olefin copolymers are composed of structural units I

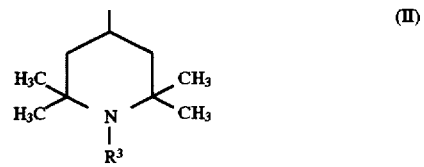

where $R^1$ is a tetramethylpiperidinyl radical of the formula II

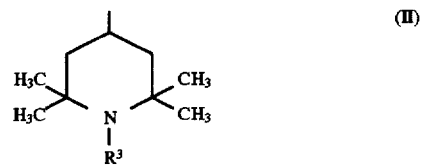

$R^3$ is hydrogen, $C_1$–$C_6$-alkyl, formyl, $C_2$–$C_6$-alkanoyl, $C_1$–$C_{12}$-alkoxy, $C_5$- or $C_6$-cycloalkoxy, cyanomethyl, 2-hydroxyethyl, benzyl or a radical of the formula —$CR^4$=CH—CO—$OR^5$, $R^4$ is hydrogen, $C_1$–$C_6$-alkyl or a radical of the formula —CO—$OR^5$, and $R^5$ is $C_5$–$C_{18}$-alkyl, $C_5$–$C_8$-cycloalkyl, $C_7$–$C_{18}$-aralkyl, phenyl or tolyl, and up to 8 mol %, based on II, of $R^1$ may furthermore be hydrogen, $C_1$–$C_{22}$-alkyl or $C_5$–$C_8$-cycloalkyl, and $R^2$ is a mixture of $C_{14}$–$C_{28}$-alkyl groups, where two of these alkyl groups, which may differ by no more than two carbon atoms, each account for at least 30% of this mixture, having an average molecular weight of from 1,000 to 50,000. The copolymers described are suitable as light stabilizers and stabilizers for organic material, in particular plastics and coatings.

8 Claims, No Drawings

MALEIMIDE/α-OLEFIN COPOLYMERS AND THEIR USE AS LIGHT STABILIZERS AND STABILIZERS FOR ORGANIC MATERIAL

This application is a continuation of application Ser. No. 08/406,907, filed on Mar. 31, 1995, abandoned, which was filed as International Application No. PCT/EP93/03202, filed Nov. 15, 1993, published as WO94/12544 Jun. 9, 1994.

The present invention relates to novel maleimide/α-olefin copolymers, a process for their preparation, their use as light stabilizers and stabilizers for organic material, in particular for plastics and coatings, and organic material stabilized with these copolymers.

It is known that organic material, in particular plastics and coatings, is very rapidly destroyed, especially as a result of the action of light. This destruction is usually manifested as yellowing, discoloration, cracking or embrittlement of the material. With light stabilizers and stabilizers, it is therefore intended to provide satisfactory protection against the destruction of organic material by light, oxygen and heat.

For example, DE-C 30 24 525 (1) relates to cationic maleic anhydride polymers comprising 0–90 mol % of unsubstituted or substituted ethylene units and 10–100 mol % of maleic anhydride units, up to 67–95% of which are converted to imide with 4-amino-2,2,6,6-tetramethylpiperidine. These polymers are suitable for stabilizing plastics to photochemical and thermal decomposition. Substituted ethylene units which may be used include those having $C_1$–$C_{20}$-alkyl radicals, ie. suitable corresponding monomer components are $C_3$–$C_{22}$-α-olefins. The copolymers described contain maleic anhydride units and ethylene units preferably in a ratio of 1:1 and preferably have molecular weights of from 1,000 to 2,000,000.

GB-A 2 145 100 (2) relates to a copolymer of N-polyalkylpiperidinyl-substituted maleimides, for example N-(2,2,6,6-tetramethyl-4-piperidinyl)maleimide, and $C_3$–$C_{20}$-α-olefins. This copolymer is suitable as a light stabilizer for plastics. Examples of α-olefins are 1-dodecene and 1-octadecene. The copolymers described have a number average molecular weight of from 1,000–50,000, preferably 1,000–5,000.

DD-A 262 439 (3) relates to a process for stabilizing polymers to light and oxidation with terpolymers, multipolymers or graft polymers comprising polyalkylpiperidine-containing maleic acid derivatives, for example N-(2,2,6,6-tetramethyl-4-piperidinyl)-maleimide, as a first component, unsubstituted or substituted ethylene units, for example $C_3$–$C_{20}$-α-olefins, as a second component and maleic acid, maleic anhydride, maleamide or maleimide as a third component, where the compounds of the third component may furthermore be O- or N-substituted by alkyl, aralkyl or phenyl. The polymers described have relative molecular weights of from 800 to 150,000, preferably from 800 to 12,000.

The poor compatibility with plastics, the short period of protective action, the natural color of the substances, the tendency to volatility and the thermal decomposition of the stabilizers on incorporation at elevated temperatures are still frequently unsatisfactory in the case of such prior art agents.

It is an object of the present invention to provide light stabilizers and stabilizers which ensure more effective protection for organic material.

We have found that this object is achieved by maleic acid/α-olefin copolymers composed of structural units of the formula I

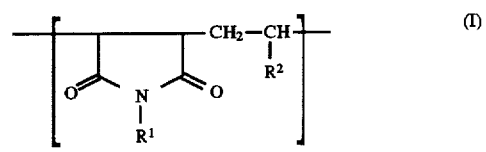

where $R^1$ is a tetramethylpiperidinyl radical of the formula II

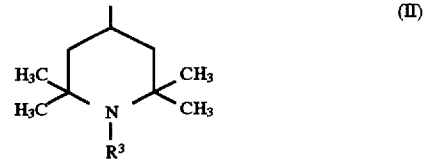

$R^3$ is hydrogen, $C_1$–$C_6$-alkyl, formyl, $C_2$–$C_6$-alkanoyl, $C_1$–$C_{12}$-alkoxy, $C_5$- or $C_6$-cycloalkoxy, cyanomethyl, 2-hydroxyethyl, benzyl or a radical of the formula —$CR_6$=CH—CO—$OR^5$, $R^4$ is hydrogen, $C_1$–$C_6$-alkyl or a radical of the formula —CO—$OR^5$, and $R^5$ is $C_1$–$C_{18}$-alkyl, $C_5$–$C_8$-cycloalkyl, $C_7$–$C_{18}$-aralkyl, phenyl or tolyl, and up to 8 mol %, based on II, of $R^1$ may furthermore be hydrogen, $C_1$–$C_{22}$-alkyl or $C_5$–$C_8$-cycloalkyl, and $R^2$ is a mixture of $C_{14}$–$C_{28}$-alkyl groups, where two of these alkyl groups, which may differ by no more than two carbon atoms, each account for at least 30% of this mixture, having an average molecular weight of from 1,000 to 50,000.

Maleimide/α-olefin copolymers having an average molecular weight of from 1,500 to 10,000, in particular from 2,000 to 5,000, are preferred. The stated molecular weights are number average molecular weights.

$R^2$ is a mixture of $C_{14}$–$C_{28}$-alkyl, preferably $C_{16}$–$C_{24}$-alkyl, in particular $C_{18}$–$C_{22}$-alkyl, groups, ie. the copolymer is based on $C_{16}$–$C_{30}$-α-olefins, preferably $C_{18}$–$C_{26}$-α-olefins, in particular $C_{20}$–$C_{24}$-α-olefins as building blocks. $R^2$ is preferably linear alkyl.

The presence of a mixture of alkyl groups for $R^2$ is to be understood as meaning that, as a statistical average over the total number of all copolymer molecules present, two specific alkyl groups, which may differ by no more than 2 carbon atoms, each account for at least 30%, preferably at least 40%, of this mixture. These are in particular mixtures of 3 specific alkyl groups, eg. octadecyl, eicosyl and docosyl, where two of these groups which differ by 2 carbon atoms account for more than 40% and the third group for from 3 to 18% of the mixture; further alkyl groups having slightly less than 18 or slightly more than 22 carbon atoms may be present in the mixture in minor amounts, usually in amounts of less than 2%.

Suitable $C_1$–$C_6$-alkyl radicals (for $R^3$ and $R^4$), $C_1$–$C_{18}$-alkyl radicals (for $R^5$) and $C_1$–$C_{22}$-alkyl radicals (for $R^1$) are branched and in particular straight-chain radicals, especially methyl, ethyl, n-propyl, isopropyl, n-butyl, isobutyl, sec-butyl, tert-butyl, n-amyl, isoamyl, sec-amyl, tert-amyl, neopentyl, n-hexyl, n-heptyl, n-octyl, 2-ethylhexyl, n-nonyl, isononyl, n-decyl, n-undecyl, n-dodecyl, n-tridecyl, isotridecyl, n-tetradecyl, n-pentadecyl, n-hexadecyl, n-heptadecyl, n-octadecyl, n-nonadecyl, n-eicosyl and n-docosyl.

Suitable straight-chain or branched $C_1$–$C_{18}$-alkanoyl radicals $R^3$ are in particular acetyl, as well as propionyl, butyryl, isobutyryl, pentanoyl and hexanoyl.

Particularly suitable straight-chain or branched $C_1$–$C_{12}$-alkoxy groups $R^3$ are $C_6$–$C_8$-alkoxy, such as n-hexyloxy, isohexyloxy, n-octyloxy, 2-ethylhexyloxy and isooctyloxy, as well as methoxy, ethoxy, n-propoxy, isopropoxy, n-butoxy, isobutoxy, sec-butoxy, tert-butoxy, n-pentyloxy, n-nonyloxy, n-decyloxy, n-undecyloxy and n-dodecyloxy.

$C_5$- and $C_6$-cycloalkoxy groups for $R^3$ are in particular cyclopentyloxy and cyclohexyloxy.

Particularly suitable $C_5$–$C_8$-cycloalkyl radicals $R^1$ and $R^5$ are cyclopentyl and cyclohexyl, as well as cycloheptyl, cyclooctyl, methylcyclopentyl, dimethylcyclopentyl, methylcyclohexyl, ethylcyclohexyl and dimethylcyclohexyl.

Examples of suitable $C_7$–$C_{18}$-aralkyl radicals $R^5$ are naphthylmethyl, diphenylmethyl and methylbenzyl, but in particular $C_7$–$C_{18}$-phenylalkyl, such as 1-phenylethyl, 2-phenylethyl, 1-phenylpropyl, 2-phenylpropyl, 3-phenylpropyl, 2-phenylprop-2-yl, 4-phenylbutyl, 2,2-dimethyl-2-phenylethyl, 5-phenylamyl, 10-phenyldecyl, 12-phenyldodecyl and especially benzyl.

Suitable tolyl radicals are ortho-, meta- and especially para-tolyl.

$R^1$ is preferably a tetramethylpiperidinyl radical II, where $R^3$ is hydrogen, $C_1$–$C_6$-alkyl, in particular methyl, or a radical of the formula —CH=CH—CO—$OR^6$, where $R^6$ is $C_1$–$C_6$-alkyl, in particular methyl or ethyl.

The presence of up to 8, in particular up to 5, mol %, based on II, of hydrogen, $C_1$–$C_{22}$-alkyl or $C_5$–$C_8$-cycloalkyl as substituents $R^1$ on the maleimide nitrogen is to be understood as meaning that this mixture of tetramethylpiperidinyl radicals II and other substituents I can occur as a statistical average over the total number of all copolymer molecules present with structural units I. Incorporation of small amounts of radicals $R^1$ differing from tetramethylpiperidinyl substituents results in a slight modification of the properties of the novel maleimide/α-olefin copolymers.

The present invention therefore also relates to a process for the preparation of the novel maleimide/α-olefin copolymers, wherein a maleic anhydride/α-olefin copolymer composed of structural units of the formula III

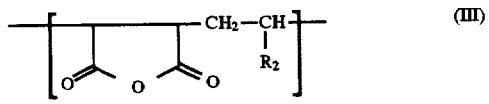

is reacted with a 4-aminotetramethylpiperidine of the general formula IV

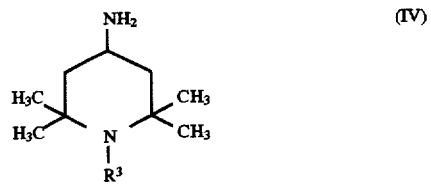

and if desired up to 8, in particular up to 5, mol %, based on IV, of ammonia, a $C_1$–$C_{22}$-alkylamine or a $C_5$–$C_8$-cycloalkylamine in an organic solvent at from 100 to 220° C. The molar ratio of anhydride groups in III to primary amine IV is advantageously 1:1 or roughly 1:1.

Particularly suitable organic solvents are aromatic hydrocarbons, such as toluene, xylenes or mesitylene, and halohydrocarbons or nitrohydrocarbons, such as chlorobenzene, dichlorobenzenes or nitrobenzene. Industrial mixtures of such aromatics are particularly important. However, aromatic-free hydrocarbon mixtures may also be used if they have an appropriately high boiling range.

The reaction temperature should preferably be chosen to be from 120° to 200° C., in particular from 140° to 175° C. The water formed in the reaction is advantageously distilled off as an azeotropic mixture. The reaction is usually carried out at atmospheric pressure and is complete, as a rule, after from 1 to 5 hours.

The maleic anhydride/α-olefin copolymers having structural units III and used as starting materials are obtainable by known preparation processes, by polymerization of maleic anhydride with the corresponding α-olefin mixtures, for example similarly to Houben-Weyl, Methoden der Organischen Chemie, Volume E20/2, pages 1237–1248 (1987).

Both the novel maleimide/α-olefin copolymers having structural units I and the maleic anhydride/α-olefin copolymers having structural units III and used as starting materials are as a rule 1:1 copolymers consisting of alternate units of maleic acid derivative and olefin.

The novel maleimide/α-olefin copolymers are very useful for stabilizing organic material to the action of light, oxygen and heat. They are added to the organic materials to be stabilized in a concentration of from 0.01 to 5, preferably from 0.02 to 1, % by weight, based on the organic material, before, during or after their preparation.

Organic material is to be understood as meaning, for example, cosmetic preparations, such as ointments and lotions, pharmaceutical formulations, such as pills and suppositories, photographic recording material, such as photographic emulsions, or intermediates for plastics and coatings, but in particular plastics and coatings themselves.

The present invention furthermore relates to organic material, in particular plastics or coatings, which is stabilized to the action of light, oxygen and heat and contains the novel copolymers in the abovementioned concentrations.

All known apparatuses and methods for mixing stabilizers or other additives into polymers may be used for mixing the novel copolymers, especially with plastics.

The organic material stabilized by the novel copolymers may also contain further additives, for example antioxidants, light stabilizers, metal deactivators, antistatic agents, flame-retardant agents, pigments and fillers.

Antioxidants and light stabilizers which may be added in addition to the novel copolymers are, for example, compounds based on sterically hindered phenols or costabilizers containing sulfur or phosphorus.

Examples of such phenolic antioxidants are 2,6-di-tert-butyl-4-methylphenol, n-octadecyl β-(3,5-di-tert-butyl-4-hydroxyphenyl)-propionate, 1,1,3-tris-(2-methyl-4-hydroxy-5-tert-butylphenyl)-butane, 1,3,5-trimethyl-2,4,6-tris-(3,5-di-tert-butyl-4-hydroxybenzyl)-benzene, 1,3,5-tris-(3,5-di-tert-butyl-4-hydroxybenzyl) isocyanurate, 1,3,5-tris-[β-(3,5-di-tert-butyl-4-hydroxyphenyl)-propionylethyl] isocyanurate, 1,3,5-tris-(2,6-dimethyl-3-hydroxy-4-tert-butylbenzyl) isocyanurate and pentaeythrityl tetrakis-[β-(3,5-di-tert-butyl-4-hydroxyphenyl)-propionate].

Examples of suitable phosphorus-containing antioxidants are tris-(nonylphenyl) phosphite, distearyl pentaerythrityl diphosphite, tris-(2,4-di-tert-butylphenyl) phosphite, tris-(2-tert-butyl-4-methylphenyl) phosphite, his-(2,4-di-tert-butylphenyl)pentaerythrityl diphosphite and tetrakis-(2,4-di-tert-butylphenyl)4,4'-biphenylene diphosphite.

Examples of sulfur-containing antioxidants are dilauryl thiodipropionate, dimyristyl thiodipropionate, distearyl thiodipropionate, pentaerythrityl tetrakis-(β-laurylthiopropionate) and pentaerythrityl tetrakis-(β-hexylthiopropionate).

Further antioxidants and light stabilizers which may be used together with the novel copolymers are, for example, 2-(2'-hydroxyphenyl)-benzotriazoles, 2-(hydroxybenzophenones, aryl esters of hydroxybenzoic acids, α-cyanocinnamic acid derivatives, benzimidazolecarboxanilides, nickel compounds or oxalic acid dianilides.

Examples of plastics which may be stabilized by the novel copolymers are:

polymers of mono- and diolefins, eg. low density and high density polyethylene, polypropylene, linear polybut-1-ene, polyisoprene and polybutadiene, and copolymers of mono- or diolefins or mixtures of the stated polymers; copolymers of mono- or diolefins with other vinyl monomers, for example ethylene/alkyl acrylate copolymers, ethylene/alkyl methacrylate copolymers, ethylene/vinyl acetate copolymers or ethylene/acrylic acid copolymers; polystyrene and copolymers of styrene and α-methylstyrene with dienes and/or acryloyl derivatives, for example styrene/butadiene, styrene/acrylonitzile (SAN), styrene/ethyl methacrylate, styrene/butadiene/ethyl acrylate, styrene/acrylonitrile methacrylate, acrylonitrile/butadiene/styrene (ABS) or methyl methacrylate/butadiene/styrene (MBS); halogen-containing polymers, for example polyvinyl chloride, polyvinyl fluoride, polyvinylidene fluoride and copolymers thereof;

polymers which are derived from α, β-unsaturated acids and derivatives thereof, such as polyacrylates, polymethacrylates, polyacrylamides and polyacrylonitriles;

polymers which are derived from unsaturated alcohols and amines or from their acryloyl derivatives or acetals, for example polyvinyl alcohol and polyvinyl acetate;

polyurethanes, polyamides, polyureas, polyesters, polycarbonates, polysulfones, polyethersulfones and polyetherketones.

The novel copolymers can also be used for stabilizing coatings, for example industrial coatings. Particularly noteworthy among these are baking finishes, and among these in turn vehicle finishes, preferably two-coat finishes. They may also be used, for example, for coating materials for exterior coats on buildings, other structures or industrial apparatuses.

The novel copolymers may be added to the coating in solid or dissolved form. Their goad solubility in coating systems is particularly advantageous.

The novel copolymers are preferably used for stabilizing polyamides and ABS and SAN polymers, in particular molding materials consisting thereof, and coatings.

K further preferred field of use is the stabilization of low density and high density polyethylene and of polypropylene and polyamide, for example also of fibers produced therefrom.

Owing to their migration resistance, the novel copolymers are particularly suitable for stabilizing articles having a high ratio of surface area to volume, in particular films, tapes and fibers.

The novel copolymers exhibit good compatibility with the conventional types of plastic and good solubility in, and excellent compatibility with, the conventional coating systems. As a rule, they have very little or no natural color, are stable at the usual processing temperatures for plastics and coatings, are nonvolatile and in particular provide a long-term protection for the materials treated with them.

The surprising result that a novel maleimide/α-olefin copolymer in which $R^2$ comprises a mixture of $C_{18}$–$C_{22}$-alkyl groups (cf. Example) has substantial advantages in its action compared with the similar maleimide/α-olefin copolymer which is disclosed in (2) and in which $R^2$ is $C_{16}$-alkyl (cf. Comparative Example A) is documented by the stated comparison of the two copolymers in polypropylene injection molded parts.

EXAMPLE 117 g of 4-amino-2,2,6,6-tetramethylpiperidine were added dropwise in the course of 20 minutes to a refluxing solution of 203 g of an alternating 1:1 copolymer of maleic anhydride and an α-olefin mixture having the composition

| octadec-1-ene | 1% by weight |
| eicos-1-ene | 49% by weight |
| docos-1-ene | 42% by weight |
| tetracos-1-ene | 8% by weight |
| hexacos-1-ene | <0.1% by weight | in 400 ml of a commercial aromatic hydrocarbon mixture having a boiling range of 160°–170° C. The mixture was then heated at the boil for a further 180minutes at the same temperature. When no further water separated off in the water separator, the solvent was distilled off under reduced pressure. The solidified melt was milled and gave 250 g of N-(2,2,6,6-tetramethyl-4-piperidinyl)-maleimide/$C_{20}$–$C_{24}$-α-olefin copolymer in the form of a pale yellow powder of melting point 104°–111° C.

COMPARATIVE EXAMPLE A

An N-(2,2,6,6-tetramethyl-4-piperidinyl)-maleimide/octadec-1-ene copolymer having a melting point of 60°–69° C. was prepared from an alternating 1:1 maleic anhydride/octadec-1-ene copolymer similarly to the Example.

Performance Characteristics

Preparation of Polypropylene Test Specimens 0.5% by weight of the stabilizer from the Example or Comparative Example A was dissolved in polypropylene of the type Novolen® 1100° C. by extruding once at a melt temperature of 240° C., and the resulting granules were injection molded at 240° C. to give 2 mm thick test specimens.

The lightfastness and weather resistance of the test specimens were tested in a Xenotest® 1200 accelerated weathering apparatus. The surface characteristics of the test specimen as a function of the weathering time is a measure of the photooxidative degradation of the polymer. The time taken for the first crack to appear is therefore recorded.

In the test specimens which contained the prior art stabilizer from Comparative Example A cracking occurred after only 2,500 hours, whereas in the test specimens which contained the novel stabilizer from the Example cracking did not occur until after 3,000 hours.

We claim:

1. A maleimide/α-olefin copolymer composed of structural units of the formula I

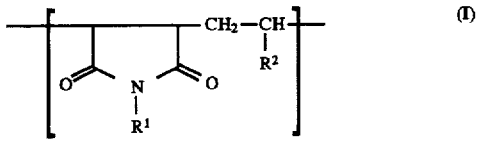

where $R^1$ is a tetramethylpiperidinyl radical of the formula II

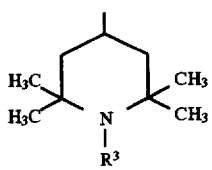
(II)

$R^3$ is hydrogen, $C_1$–$C_6$-alkyl, formyl, $C_2$–$C_6$-alkanoyl, $C_1$–$C_{12}$-alkoxy, $C_5$- or $C_6$-cycloalkoxy, cyanomethyl, 2-hyrdoxy-ethyl, benzyl or a radical of the formula —$CR^4$=CH—CO—$OR^5$, $R^4$ is hydrogen, $C_1$–$C_6$-alkyl or a radical of the formula —CO—$OR^5$, and $R^5$ is $C_1$–$C_{18}$-alkyl, $C_5$–$C_8$-cycloalkyl, $C_7$–$C_{18}$-aralkyl, phenyl or tolyl, and up to 8 mol %, based on II, of $R^1$ may furthermore be hydrogen, $C_1$–$C_{22}$-alkyl or $C_5$–$C_8$-cycloalkyl, and $R^2$ is a mixture of $C_{18}$–$C_{28}$-alkyl groups, said mixture comprising at least two $C_{18}$–$C_{28}$-alkyl groups which may differ by no more than two carbon atoms, and each of said two $C_{18}$–$C_{28}$-alkyl groups being present in an amount of at least 30% of said mixture, and said copolymer having a number average molecular weight of from 1,000 to 50,000.

2. A maleimide/α-olefin copolymer as claimed in claim 1, in which $R^2$ is a mixture of $C_{16}$–$C_{24}$-alkyl groups, where two of these alkyl groups, which may differ by no more than two carbon atoms, account in each case for at least 40% of this mixture.

3. A maleimide/α-olefin copolymer as claimed in claim 1, in which $R^1$ is a tetramethylpiperidinyl radical II, where $R^3$ is hydrogen, $C_1$–$C_6$-alkyl or a radical of the formula —CH=CH—CO—$OR^6$ and $R^6$ is $C_1$–$C_6$-alkyl.

4. A process for the preparation of a maleimide/α-olefin copolymer as claimed in claim 1, wherein a maleicanhydride/α-olefin copolymer composed of structural units of the formula III

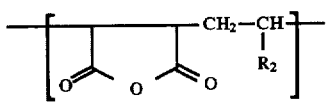
(III)

is reacted with a 4-aminotetramethylpiperidine of the formula IV

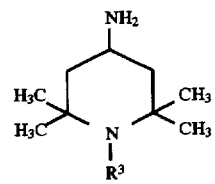
(IV)

and, if desired, up to 8 mol %, based on IV, of ammonia, a $C_1$–$C_{22}$-alkylamine or a $C_5$–$C_8$-cycloalkylamine in an organic solvent at from 100° to 220° C.

5. An organic material stabilized to the action of light, oxygen and heat, containing from 0.01 to 5% by weight, based on the amount of the organic material, of one or more maleimide/α-olefin copolymers as claimed in claim 1.

6. A plastic or surface coating stabilized to the action of light, oxygen and heat, containing from 0.01 to 5% by weight, based on the amount of the plastic or surface coating, of one or more maleimide/α-olefin copolymers as claimed in claim 1.

7. A method for stabilizing an organic material to the action of light, oxygen and heat, comprising mixing a maleimide/α-olefin copolymer as claimed in claim 1, with said organic material.

8. A method for stabilizing plastics and surface coatings to the action of light, oxygen and heat, comprising mixing a maleimide/α-olefin copolymer as claimed in claim 1, with said plastics or coatings.

* * * * *